United States Patent [19]

Izawa et al.

[11] 3,720,649

[45] March 13, 1973

[54] METHOD FOR PRODUCING POLYESTERS FROM BENZENEDICARBOXYLIC ACID AND ALKYLENE OXIDE

[75] Inventors: Nobuo Izawa; Yasuhiro Iizuka; Yoshiaki Kubota, all of Osaka-fu, Japan

[73] Assignee: Kanegafuchi Boseki Kabushiki Kaisha, Tokyo, Japan

[22] Filed: Dec. 1, 1970

[21] Appl. No.: 94,165

[30] Foreign Application Priority Data

Dec. 8, 1969    Japan ................................. 44/98775
Dec. 26, 1969   Japan ................................. 45/1232
Dec. 26, 1969   Japan ................................. 45/1233

[52] U.S. Cl. ......... 260/75 M, 260/75 EP, 260/475 P, 260/475 PR
[51] Int. Cl. ............................................. C08g 17/7
[58] Field of Search ........ 260/75 M, 475 P, 475 PR, 75 ET

[56] References Cited

UNITED STATES PATENTS

| 3,008,981 | 11/1961 | Vaitekunas | 260/475 |
| 3,052,711 | 9/1962 | Glogau et al. | 260/475 |
| 3,120,560 | 2/1964 | Keck | 260/475 |
| 3,268,575 | 8/1966 | Keck | 260/475 |

FOREIGN PATENTS OR APPLICATIONS

| 555,359 | 8/1953 | Canada |
| 20,617 | 4/1969 | Japan |

Primary Examiner—Melvin Goldstein
Attorney—Woodhams, Blanchard & Flynn

[57] ABSTRACT

A polyester having a high quality is produced by reacting a benzendicarboxylic acid with an alkylene oxide in an aqueous medium containing an alkali metal ion of 2.7 to 10 mole per 1 l of water, extracting the reaction mixture with an organic solvent to separate diglycol ester, concentrating or/and crystallizing the extracted solution and then effecting polycondensation.

9 Claims, No Drawings

METHOD FOR PRODUCING POLYESTERS FROM BENZENEDICARBOXYLIC ACID AND ALKYLENE OXIDE

The present invention relates to a method for producing polyesters from a benzenedicarboxylic acid and an alkylene oxide.

As a method for producing a polyester from a benzenedicarboxylic acid and an alkylene oxide, the following processes have been proposed:
1. A benzenedicarboxylic acid and an alkylene oxide are reacted by heating and successively a polycondensation is effected.
2. A benzenedicarboxylic acid and an alkylene oxide are reacted by heating and then diglycol ester is separated by crystallization from a solvent and then polycondensed.

In the above process 1, a catalyst, such as, a tertiary amine, an alkali metal and the like used in the original stage of the reaction remains and causes a side-reaction in the polycondensation, so that the resulting polymer is colored, the viscosity is not increased satisfactorily and the melting point is low, and consequently a high quality of polyester cannot be obtained.

In the above process 2, impurities are removed from the reaction product and consequently, a high quality of polyester can be readily obtained, but in general, the separation step for purification (for example, crystallization and the like) is troublesome and further the dissolution loss of diglycol ester is large and such a process is not advantageous commercially. Accordingly, it is considerably desired to simplify such a separation step.

British Pat. No. 623,669 and U.S. Pat. No. 3,101,366 have proposed that a benzenedicarboxylic acid and an alkylene oxide are reacted in an aqueous medium in the presence of an alkali metal catalyst in the process for producing polyester. In these processes, the reaction products contain a large amount of diethylene glycol and diethylene glycol ester and the production of such substances is very disadvantageous and if the separation for purifying diglycol ester containing a large amount of these substances is effected simply, the polyester obtained by polymerizing such diglycol ester contains ether bond and the melting point is low and the heat stability and weather resistance are poor. Thus such polyester cannot be used practically. Therefore, unless diglycol ester obtained in such a process is subjected to troublesome purification steps, commercially useful polyester cannot be produced.

An amount of an alkali metal catalyst in the reaction of terephthalic acid with ethylene oxide in the presence of an alkali metal catalyst in an aqueous medium in the above described process, is within or near the saturation solubility of alkali metal salt of terephthalic acid, which is shown in the following Table 1. This is based on the following reason. It has been believed that the alkali metal salt of terephthalic acid present in an amount of higher than the solubility of alkali metal salt of terephthalic acid has no function for the reaction.

TABLE 1

| | 30°C | 50°C | 80°C |
|---|---|---|---|
| Lithium salt | 1.8 mol/l | 1.7 mol/l | 1.6 mol/l |
| Sodium salt | 1.5 mol/l | 1.5 mol/l | 1.5 mol/l |
| Potassium salt | 2.6 mol/l | 2.6 mol/l | 2.7 mol/l |

In order to solve the above described various demerits, the inventors have made various investigations and found the following facts:
1. The presence of alkali metal salt of terephthalic acid of more than the solubility is effective for the reaction.
2. By an extraction with an organic solvent, diglycol ester and a small amount of by-produced ethylene glycol can be easily separated from the reaction system.

The object of the present invention is to provide a method for producing a high quality of polyester for shaping into fiber or film.

The other object of the present invention is to provide a method for producing commercially improved polyester.

The present invention is characterized in that a benzenedicarboxylic acid and an alkylene oxide are reacted in an aqueous medium containing an alkali metal ion of 2.7 to 10 mole per 1 l of water and from the reaction mixture diglycol ester is separated by an extraction with an organic solvent and then separated by concentration or (and) crystallization and thereafter polycondensed.

A particularly essential requirement for performing the reaction of the present invention is the presence of an alkali metal ion of 2.7 to 10 mole, preferably, 3 to 8 mole per 1 l of water. If the concentration of alkali metal ion is less than 2.7 mol/l-$H_2O$, a side-reaction of producing diethylene glycol increases and a high quality polyester cannot be obtained. On the other hand, if the concentration of alkali metal ion is more than 10 mol/l-$H_2O$, the production of an insoluble salt of dicarboxylic acid increases and the stirring becomes difficult and therefore, the side-reaction increases.

"Alkali metal ions" means lithium, sodium, potassium, rubidium and cesium, and they are used alone or in admixture and particularly, lithium and sodium are preferable, because they are high in the reaction rate and little in the side-reaction. Among them, lithium alone or in admixture is particularly preferable. In the practical reaction, the above described alkali metals are added to the reaction system in a given amount as an alkali metal salt, such as, hydroxides, carbonates, borates and the like. Of course, the salt may be added in the form of an alkali salt of benzenedicarboxylic acid.

If a conventional catalyst of a tertiary amine is used in the above described range of concentration, the reaction system is considerably colored, while the alkali metal catalyst does not cause such a coloration.

The benzenedicarboxylic acids to be used in the present invention are aromatic dicarboxylic acids, such as, terephthalic acid, isophthalic acid and the like and they are used alone or in admixture, but the other dicarboxylic acids, such as aliphatic dicarboxylic acid or aliphatic and aromatic oxycarboxylic acids may be used together with the above described aromatic dicarboxylic acid in an amount of less than 15 mol percent based on the aromatic dicarboxylic acid. The amount of these dicarboxylic acids is more than equivalent of the alkali metal ion but if the amount is more than five times by weight of the reaction aqueous solution, the stirring is difficult and such an amount is not preferable in view of the operation.

The alkylene oxide may be fed in a vapor form or under a sufficient pressure to maintain the alkylene oxide in a liquid phase. Furthermore, the alkylene oxide may be charged the total amount to be used in the reaction or added gradually.

As alkylene oxides, use may be made of ones having two to six carbon atoms in molecule and particularly, ethylene oxide and propylene oxide are used. In addition to these oxides, butylene oxide, amylene oxide, hexene oxide and the like can be used.

If the reaction temperature is too low, the reaction rate is slow, while if the reaction temperature is too high, the reaction occurs rapidly and the regulation of temperature is difficult and the side-reaction occurs, so that even if the polymerization is effected, a high quality of polyester cannot be obtained. Therefore, 60° – 140° C is preferable and 70° – 130° C is most preferable.

Air in the reaction vessel is previously substituted with an inert gas of nitrogen for safety sake but in the reaction the gaseous phase in the reaction vessel may be occupied by water vapor and alkylene oxide.

After the reaction, after or before water is distilled off from the reaction mixture, an organic solvent alone or in admixture, which can dissolve diglycol ester but cannot dissolve alkali metal salt of carboxylic acid, is added to the reaction mixture and the undissolved substances are separated by a centrifugal separator, filter and the like. When a solvent is added before water is distilled off, it is preferable to add a solvent which can form an azeotropic mixture with water and in this case water can be easily and completely removed. It is desirable to remove water completely as far as possible and in the case of incompletion, an alkali metal salt of carboxylic acid is dissolved therein and is liable to remain in diglycol ester and when such diglycol ester is polycondensed by heating, a coloration occurs and only an opaque polyester having a low viscosity is formed. As the organic solvent to be used in the present invention, organic solvents having a boiling point of 50° – 170° C are preferable in view of operation. Esters, such as, methyl acetate, ethyl acetate, propyl acetate, butyl acetate, ethyl formate and the like; ethers, such as tetrahydrofuran, dioxane, dipropyl ether, dibutyl ether and the like; ketones, such as, acetone, methyl ethyl ketone, methyl butyl ketone, cyclohexanone and the like; alkyl benzenes, such as, benzene, toluene, xylene, and the like; halogenated hydrocarbons, such as, chloroform, carbon tetrachloride, dichloroethane, trichlene, chlorobenzene and the like; nitriles, such as, acetonitrile, propionitrile; alcohols, such as, methanol, ethanol, propanol, butanol, amylalcohol, hexanol, cyclohexanol, and the like may be used alone or in admixture. Among them, esters, ketones and halogenate hydrocarbons are preferable and they are sufficient in a smaller amount than the other solvents and can extract more completely. The solvents other than these solvents are low in the solubility of diglycol ester, so that they must be used in a large amount, or have lower ability in the separation of diglycol esters from the reaction mixture, so that the alkali metal salt of carboxylic acid is incorporated in the resulting diglycol ester, or the amount of unreacted benzenedicarboxylic acid and monoglycol ester thereof contained increases and the stability of diglycol ester is low and the quality decreases during the storage. Particularly, the heat stability is lower in the melted stage and when it is necessary to store or ship diglycol ester in the melted state, a coloration occurs, the oligomer increases and compound having ether bonds increases, so that the quality is degraded.

The amount of solvent to be used is admissible in an amount enough to dissolve diglycol ester present in the reaction mixture, but varies depending upon the solvent, treating temperature and process and in general, the solvent is used in an amount of one to 50 times of the reaction mixture, preferably, two to 30 times and in the above described preferable solvents, two to 20 times is generally used. The higher the treating temperature, the larger the solubility of diglycol ester is and it is preferably to effect the treatment at a temperature near the boiling point of the solvent. The extraction treatment may be carried out in a batch system or a continuous system and the flows of the solvent and the substance to be extracted may be parallel, counter or cross.

The undissolved substances separated involve unreacted dicarboxylic acid, alkali metal salt of dicarboxylic acid and the like and they can be supplied again to the reaction.

After the undissolved substances are separated, the extracted solution is concentrated by distilling off the solvent to obtain a mixture of diglycol ester and a small amount of by-produced ethylene glycol. Alternatively, the resulting extract or the solution concentrated to some extent is cooled to separate diglycol ester by crystallization.

The resulting diglycol ester or the mixture of diglycol ester and a small amount of ethylene glycol, directly or if necessary, after being purified with water or an organic solvent or a mixture thereof, is polycondensed at a temperature of higher than 200° C by adding a polymerization catalyst to form a high quality of polyester. When a diglycol ester or a mixture of diglycol ester and ethylene glycol is formed by effecting a concentration operation, it is advantageous for immediately effecting the polycondensation or shipping or storage to obtain said diglycol ester or the mixture in a liquid form, but it is admissible to obtain same in a solid or paste form. Furthermore, the polymerization catalyst may be added before the concentration of the extracted solution.

According to the method of the present invention polyesters having excellent heat stability and weather resistance and no coloration can be produced commercially. If the requirements of the reaction for producing diglycol ester in the present invention are not satisfied, only colored diglycol ester having a large number of unstable ether bonds is obtained, so that the simple and efficient process in the present invention, wherein diglycol ester is separated by an extraction with an organic solvent and then concentrated or (and) separated by crystallization, thereafter polycondensed cannot be used. It depends upon the quality of the starting material of dicarboxylic acid, whether crystallization and other purification steps should be carried out or not after the extraction. In the above described process for producing diglycol ester according to the present invention, the by-production of colored substance and other substances which need the separation of crystallization are very few. Accordingly, when a relatively high quality of starting material is used, it is preferable to adopt the concentration operation which is more efficient and inexpensive than the crystallization operation.

Moreover, when the process of the present invention in which diglycol ester is extracted with an organic solvent and then concentrated or (and) crystallized and thereafter polycondensed, is not adopted, it is necessary in order to separate a large amount of reaction catalyst from the resulting product, to repeat the crystallization of diglycol ester many times by dilution of the reaction product with a large amount of water and to concentrate the aqueous solution (mother liquid) which is high in heat capacity and in an evaporation cost. Furthermore, when there are impurities (colored substance in the starting material of dicarboxylic acid, carbonyl compound and the like) which are difficult in the separation by recrystallization from aqueous medium, it is necessary to add a purification step of recrystallization by means of an organic solvent separately, so that such a means is troublesome and is not advantageous commercially. Accordingly, such a process cannot attain the merits of the present invention in which by-products in the production of diglycol ester are very few and colored substances are not formed and a high efficiency can be attained.

The following examples are given in illustration of this invention and are not intended as limitations thereof.

It is apparent that many variations may be made in the process of this invention without departing from the spirit and scope thereof. The "part" in examples means "by weight" and the intrinsic viscosity is measured in orthochlorophenol at 30° C and the melting point of the polymer is measured on a heat plate by a polarization microscope.

EXAMPLE 1

24 parts of sodium hydroxide was dissolved in 100 parts of water to prepare 6 mol/l of an aqueous solution of sodium hydroxide. The resulting solution and 130 parts of highly pure terephthalic acid containing about 25 ppm of 4-carboxybenzaldehyde and 5 ppm of ash were charged in an autoclave equipped with a stirrer and air in the autoclave was substituted with nitrogen and then the mixture was heated at 100° C under atmospheric pressure. Ethylene oxide was introduced under a pressure of 4 kg/cm² into the autoclave for 40 minutes while stirring. The autoclave was returned to atmospheric pressure and unreacted ethylene oxide was recovered and further the heating was continued to remove water. Then 500 parts of n-butyl acetate was added to the reaction mixture and the resulting mixture was heated at 120° C and then filtered off the undissolved substances, which were 90 parts. The undissolved substances involved terephthalic acid, sodium terephthalate and sodium salt of monoester, which were supplied again to the next reaction. The filtrate was heated to evaporate and recover n-butyl acetate. The residue was added with 0.04 part of antimony acetate and the mixture was maintained at 280° C under 0.5 mmHg for 3 hours to obtain transparent polyethylene terephthalate having an intrinsic viscosity of 0.67 and a melting point of 265° C.

Before the extraction with n-butyl acetate, a sample of the reaction mixture was determined with respect to ethylene glycol by gaschromatography. Said sample was hydrolyzed and then determined with respect to diethylene glycol by gaschromatography. As the result, 47 parts of ethylene oxide was reacted and the conversion into ethylene glycol was 12 percent and the conversion into diethylene glycol and diethylene glycol ester was only 2.2 percent.

COMPARATIVE EXAMPLE 1

After the reaction was effected under the same condition as described in Example 1, the autoclave was returned to atmospheric pressure and the unreacted ethylene oxide was recovered and then a part of the reaction mixture was taken out and polymerized under a pressure of 0.5 mmHg at 280° C for 3 hours by using antimony acetate as a catalyst. The resulting polymer was yellowish brown and opaque and had an intrisnic viscosity of 0.36.

On the other hand, when the reaction mixture was heated and filtered, the filtrate was cooled and solidified and then subjected to a centrifugal separator to obtain crystals, which were recrystallized twice from water and subjected to a centrifugal separator. The resulting crystals were washed with water at 5° C twice and dried. The transparent crystals were polymerized under a pressure of 0.5 mmHg, at 280° C for 3 hours by using a catalyst of antimony acetate to obtain colorless transparent polyethylene terephthalate having an intrisnic viscosity of 0.67 and a melting point of 265° C.

COMPARATIVE EXAMPLE 2

8 parts of sodium hydroxide was dissolved in 100 parts of water to prepare 2 mol/l of an aqueous solution and 80 parts of highly pure terephthalic acid was added thereto and ethylene oxide was supplied in the same manner as described in Example 1 for 60 minutes. The autoclave was returned to atmospheric pressure and unreacted ethylene oxide was recovered and the residue was heated to evaporate water. Then 400 parts of n-butyl acetate was added thereto and undissolved substances were filtered off at 120° C. The filtrate was heated to distill off and recover n-butyl acetate and then 0.03 part of antimony acetate was added to the residue and the resulting mixture was heated at 280° C. under a pressure of 0.5 mmHg for 3.5 hours to obtain polyethylene terephthalate having an intrisnic viscosity of 0.58 and a melting point of 259° C, which was colored light yellow, because this polymer contained a large amount of unstable ether linkage.

COMPARATIVE EXAMPLE 3

24 parts of sodium hydroxide was dissolved in 100 parts of water in the same manner as described in Example 1 and the resulting solution and 130 parts of terephthalic acid were charged in the autoclave. Air in the autoclave was purged with nitrogen and the mixture in the autoclave was heated at 160° C. Then ethylene oxide was supplied under a pressure of 7 Kg/cm² for 15 minutes while stirring. The autoclave was returned to atmospheric pressure and the reaction mixture was taken out and analyzed. 54 parts of ethylene oxide was reacted and the conversion into ethylene glycol was 37 percent and the conversion into diethylene glycol was 17 percent.

EXAMPLE 2

12 parts of lithium hydroxide was dissolved in 100 parts of water to prepare 5 mol/l of an aqueous solution. The resulting solution and 90 parts of highly pure terephthalic acid were charged into an autoclave equipped with a stirrer. Air in the autoclave was purged with nitrogen and the mixture was heated at 100° C under atmospheric pressure. Then ethylene oxide was supplied thereto under a pressure of 2.5 Kg/cm² for 20 minutes. The autoclave was returned to atmospheric pressure and unreacted ethylene oxide was recovered. Thereafter, 1,000 parts of n-butyl acetate was added thereto and water was removed as an azeotropic mixture (B.P. 90.2° C, water 28.7 percent) with n-butyl acetate and then the undissolved substances were filtered off, which were 79 parts. The undissolved substances were used in the next reaction. The filtrate was concentrated to recover n-butyl acetate. 0.02 part of antimony acetate was added thereto and the resulting mixture was heated at 280° C under a pressure of 0.5 mmHg for 3 hours to obtain colorless transparent polyethylene terephthalate having an intrisnic viscosity of 0.69 and a melting point of 265° C.

A sample of the reaction mixture before the extraction with n-butyl acetate was analyzed. 22 parts of ethylene oxide was reacted and the conversion into ethylene glycol was 9 percent and the conversion into diethylene glycol and diethylene glycol ester was 1.7 percent.

EXAMPLE 3

33.6 parts of potassium hydroxide was dissolved in 100 parts of water to prepare 6 mol/l of an aqueous solution. The solution and 100 parts of highly pure terephthalic acid were charged in an autoclave equipped with a stirrer and air in the autoclave was purged with nitrogen. The mixture was heated at 100° C under atmospheric pressure. Ethylene oxide was supplied under a pressure of 4 Kg/cm² for 30 minutes. The autoclave was returned to atmospheric pressure and unreacted ethylene oxide was recovered and the residue was continuously heated to remove water. Then 800 parts of methyl ethyl ketone was added thereto and the mixture was heated at 75° C and undissolved substances were filtered off and the filtrate was concentrated to recover methyl ethyl ketone. 0.01 part of antimony oxide was added and the mixture was maintained at 280° C under a pressure of 0.5 mmHg for 3.5 hours to obtain colorless transparent polyethylene terephthalate having an intrisnic viscosity of 0.64 and a melting point of 264° C.

A sample of the reaction mixture was analyzed before the extraction with methyl ethyl ketone and 26 parts of ethylene oxide was reacted and the conversion into ethylene glycol was 18 percent and the conversion into diethylene glycol ester was 2.9 percent.

EXAMPLE 4

12 parts of lithium hydroxide was dissolved in 100 parts of water to prepare the 5 mol/l solution and the resulting solution and 150 parts of highly pure terephthalic acid were charged in an autoclave equipped with a stirrer and air in the autoclave was purged with nitrogen and the pressure was reduced and the mixture was gradually heated to 70° C. Then ethylene oxide was supplied under a pressure of 4 Kg/cm² while stirring for 110 minutes. The autoclave was returned to atmospheric pressure and unreacted ethylene oxide was recovered and the heating was continued to distill off the greater part of water. 850 parts of dichloroethane was added thereto and the mixture was heated to the boiling point to distill off water completely and undissolved substances were filtered off. The filtrate was concentrated to recover dichloroethane. To the resulting concentrate were added 50 parts of highly pure terephthalic acid and 0.03 part of antimony acetate and the mixture was heated gradually and the produced was evaporated while maintaining 3 Kg/cm² gauge. After reaching 275° C, the polymerization was effected under a reduced pressure of 0.3 mmHg for 3.5 hours to obtain colorless transparent polyethylene terephthalate having an intrinsic viscosity of 0.65 and a melting point of 267° C. Before the extraction with dichloroethane, a sample of the reaction mixture was analyzed. 60 parts of ethylene oxide was reacted and the conversion into ethylene glycol was 6 percent and the conversion into diethylene glycol and diethylene glycol ester was only 0.9 percent. This is the reason why the melting point of the resulting polymer is high.

On the other hand, when terephthalic acid and ethylene oxide were reacted in the same condition as described above except that the reaction temperature was 40° C and the pressure was 2.5 Kg/cm², the fluidity of the reaction mixture of a slurry state was poor and the stirring was very difficult and therefore the reaction was very slow and was not practical.

EXAMPLE 5

In 100 parts of water was dissolved 7.2 parts of sodium hydroxide to prepare 3 mol/l of an aqueous solution. The resulting solution was introduced into an autoclave equipped with a stirrer together with 40 parts of light yellow crystals of crude terephthalic acid prepared from p-xylylene by air oxydation containing about 5,000 ppm of 4-carboxybenzaldehyde and about 40 ppm of ash as typical impurities. After air in the autoclave was purged with nitrogen, the pressure was reduced and the mixture was gradually heated up to 60° C. Then, the autoclave was charged with ethylene oxide kept at a pressure of 4 Kg/cm² while stirring. At the same time, 60 parts of the crude terephthalic acid was charged into the autoclave for 60 minutes at a substantially constant rate. After completion of the addition of the crude terephthalic acid, the reaction was further continued for 3 minutes while introducing ethylene oxide into the autoclave to decrease the amount of unreacted terephthalic acid. Then, the pressure in the autoclave was reduced to atmospheric pressure to recover unreacted ethylene oxide. After a major part of water was distilled off by heating, 650 parts of n-butyl acetate was added to the reaction mixture, and the resulting diglycol ester and a small amount of ethylene glycol were separated by extraction from the catalyst and unreacted terephthalic acid while removing the remaining water by azeotropic distillation. The extracted solution was added with about 6 percent by weight of powdery active clay based on the diglycol ester contained in the solution, stirred for 10 minutes, filtered and then cooled to separate the diglycol ester. The active clay was substantially not effective for decoloring, but was effective for removing metal impurities contained in the raw materials and a very small amount of catalyst (alkali metal ion).

The resulting crystals were slightly yellow. The crystals were decolored by dissolving in about 5 times amount by weight of hot water and treating with about 2.5 percent by weight of powdery active carbon. After the active carbon was removed the hot solution was cooled to separate colorless crystals. The crystals were added into 0.02 percent by weight of antimony oxide and polymerized for about 3.5 hours under a reduced pressure to obtain a polymer having an intrinsic viscosity of 0.68, a melting point of 268° C and an excellent whiteness.

A sample of the reaction mixture before the extraction with n-butyl acetate was analyzed. 40 parts of the ethylene oxide was reacted, and the conversion of ethylene oxide into ethylene glycol was 4 percent, and that of ethylene oxide into diethylene glycol and diethylene glycol ester was only 0.6 percent.

EXAMPLE 6

In 100 parts of water was dissolved 42 parts of sodium bicarbonate to prepare 5 mol/l of an aqueous solution. The resulting solution was introduced into an autoclave equipped with a stirrer together with 120 parts of crude terephthalic acid. After air in the autoclave was purged with nitrogen, the autoclave was heated up to 100° C under atmospheric pressure and then up to 130° C while keeping the autoclave air-tight. Then, ethylene oxide was introduced into the autoclave under a pressure of 7 Kg/cm$^2$ for 20 minutes while stirring. The pressure in the autoclave was reduced to atmospheric pressure to recover unreacted ethylene oxide. Heating was further continued to remove water from the reaction mixture. Then, the reaction mixture was subjected to an extraction treatment with a mixed solvent composed of 300 parts of n-butanol and 200 parts of xylene to separate catalyst and unreacted terephthalic acid as impurities. The extracted solution was cooled to separate diglycol ester. The resulting diglycol ester was dissolved again in about 5 times amount of hot water based on the diglycol ester, and the solution was treated with about 5 percent by weight of granular active carbon based on the diglycol ester and cooled to obtain crystals of purified diglycol ester. A part of the crystals were recrystallized from about two and one-half times amount of methanol to obtain highly purified diglycol ester.

The two diglycol esters before and after the recrystallization with methanol were polymerized in the presence of 0.01 percent by weight of antimony acetate under the same condition of 0.5 mmHg, 280° C and 4 hours to obtain substantially same colorless transparent polymers, respectively. The intrinsic viscosity of the polymer when the diglycol esters were recrystallized from methanol, was 0.66, and that of the polymer when the diglycol ester was not recrystallized from methanol was 0.64. The melting point of polymer, when the diglycol ester was recrystallized from methanol was 268° C, and that of polymer, when the diglycol ester was not recrystallized from methanol was 267° C.

A sample of the reaction mixture before the extraction with the mixed solvent composed of n-butanol and xylene was analyzed. 40 percent of the ethylene oxide was reacted, and the conversion of ethylene oxide into ethylene glycol was 19 percent, and that of ethylene oxide into diethylene glycol and diethylene glycol ester was 4.4 percent.

EXAMPLE 7

Terephthalic acid and ethylene oxide were reacted under the same condition as described in Example 5, except that medium grade colorless crystalline terephthalic acid containing about 500 ppm of 4-carboxybenzaldehyde and about 10 ppm of ash as typical impurities was used. The reaction product was subjected to an extraction treatment with the use of n-butyl acetate to separate unreacted raw materials and catalyst, and the extracted solution was treated with active clay in the same manner as described in Example 5. Then, the solvent was concentrated to obtain a melt of diglycol ester. The melt was added with 0.04 percent by weight of antimony acetate, heated and polymerized for about 3 hours under a reduced pressure to obtain a polymer having an intrinsic viscosity of 0.64, a melting point of 266° C and an excellent whiteness.

EXAMPLE 8

In 100 parts of water was dissolved 12 parts of sodium hydroxide, and the resulting solution was introduced into an autoclave equipped with a stirrer together with 100 parts of highly pure terephthalic acid. After air in the autoclave was purged with nitrogen under atmospheric pressure, the autoclave was heated up to 100° C. Then, the autoclave was charged with ethylene oxide kept at a pressure of 4 Kg/cm$^2$ for 80 minutes while stirring. After the pressure in the autoclave was reduced to atmospheric pressure to recover unreacted ethylene oxide, heating was further continued to remove water. Then, 500 parts of n-butyl acetate was added to the reaction mixture, and the resulting mixture was heated up to 120° C, and undissolved substances were filtered off. The extracted solution was concentrated to obtain 97 parts of crystals of a mixture composed of diglycol ester and ethylene glycol and having a melting point of 95° C. The resulting mixture had an acid value of 1.8 (mg KOH/g) and contained 5 ppm of sodium. A part of the crystals was heated at 280° C for 3 hours under a pressure of 0.5 mmHg in the presence of an antimony acetate catalyst to obtain a colorless transparent polymer having an intrinsic viscosity of 0.64 and a melting point of 263° C. The undissolved substances were 47 parts, contained terephthalic acid, sodium terephthalate, terephthalic acid monoglycol ester and sodium salt of terephthalicacid monoglycol ester, and were able to be used again in the next reaction.

COMPARATIVE EXAMPLE 4

The same reaction mixture as produced in Example 8 was distilled to remove water therefrom and then 500 parts of n-butanol was added thereto. The resulting mixture was heated to 110° C and then undissolved substances were filtered off. The filtrate was concentrated to obtain 99 parts of a crystal having a melting point of 94° C and an acid value of 5.4. A part of the crystal was heated at 280° C under a pressure of 0.5 mmHg in the presence of antimony acetate as a catalyst, but the polymer obtained became opaque and yellowish brown.

In general, when the extraction is carried out with a lower alcohol, the alkali metal in the catalyst is apt to be incorporated into the extracted solution, so that is is necessary to effect a treatment with activated clay or ion exchange resin or a crystallization from solvent. This tendency is improved by mixing with a large amount of other solvent having a lower polarity or by using a higher alcohol, but in many cases, it is usually necessary to effect the same treatment as described in the following Example 9 which uses acetonitrile or dioxane.

EXAMPLE 9

The same reaction mixture as produced in Example 8 was extracted with 500 parts of various solvents as mentioned below to obtain a result shown in the following Table 2.

TABLE 2

| Solvent for extraction | Extraction temperature (°C) | Acid value of extract | Sodium content (ppm) |
| --- | --- | --- | --- |
| Methyl ethyl ketone | 75 | 2.1 | 12 |
| Dichloroethane | 80 | 2.2 | 10 |
| Acetonitrile | 80 | 4.0 | 120 |
| Dioxane | 90 | 6.7 | 320 |

Note: The sodium content was calculated as a single substance of Na.

The melts of the diglycol esters obtained by using methyl ethyl ketone and dichloroethane were directly polymerized at 280° C under a pressure of 0.5 mmHg in the presence of antimony acetate as a catalyst to obtain substantially colorless and transparent polymers having intrinsic viscosities of 0.66 and 0.63 and melting points of 264° C and 263° C, respectively.

In case of acetonitrile and dioxane, the resulting melts were added with a substantially equimolar amount of phosphorous acid based on the sodium content and then polymerized in the same manner as described above to obtain slightly grey polymers having intrinsic viscosities of 0.63 and 0.68 and melting points of 263° and 265° C, respectively.

COMPARATIVE EXAMPLE 5

The same reaction mixture as produced in Example 8 was extracted with toluene at 100° C, and in this case 3,500 parts of toluene was required. The obtained mixture of diglycol ester and ethylene glycol had an acid value of 4.1 and a sodium content of 200 ppm.

EXAMPLE 10

The same reaction mixture as produced in Example 8 was subjected to an extraction treatment with 500 parts of an organic acid ester as mentioned below. The obtained results are shown in the following Table 3.

TABLE 3

| Solvent for extraction | Extraction temperature (°C) | Acid value of extract (mg KOH/g) | Sodium content (ppm) |
| --- | --- | --- | --- |
| Methyl acetate | 50 | 2.1 | 9 |
| Ethyl acetate | 70 | 1.9 | 7 |
| Methyl propionate | 75 | 2.1 | 9 |
| Ethyl formate | 50 | 2.2 | 10 |

As seen from the above table, these organic acid esters show a remarkable separating effect similar to that in n-butyl acetate. The thus obtained mixture of diglycol ester and ethylene glycol was polymerized at 280° C under a pressure of 0.5 mmHg in the presence of antimony acetate as a catalyst to obtain a colorless and transparent polymer having an intrinsic viscosity of 0.62 to 0.68 and a melting point of 263° to 264° C. Regarding the color tone (whiteness) of the polymer, the organic acid esters are most excellent extracting agent.

EXAMPLE 11

37.2 parts of sodium carbonate was dissolved in 100 parts of water to prepare 6 mol/l of an aqueous solution. This solution and 130 parts of terephthalic acid were charged into an autoclave equipped with a stirrer and heated to 100° C under atmospheric pressure after air in the autoclave was purged with nitrogen. Then, ethylene oxide was charged, while stirring, under a pressure of 4 Kg/cm$^2$ for 40 minutes. The pressure of the reactor was returned to atmospheric pressure and unreacted ethylene oxide was recovered. Then, the resulting reaction mixture was added with 500 parts of dioxane and heated to remove an azeotropic mixture of water and dioxane (boiling point: 87.8° C, water content: 17.2 percent), and thereafter undissolved substances were filtered off. The filtrate was concentrated to recover dioxane and 0.015 part of antimony oxide was added, and then the resulting mixture was maintained at 280° C under a pressure of 0.5 mmHg for 3 hours to obtain a substantially colorless and slightly opaque polyethylene terephthalate having a melting point of 265° C and an intrinsic viscosity of 0.68.

EXAMPLE 12

24 parts of sodium hydroxide was dissolved in 100 parts of water to prepare 6 mol/l of an aqueous solution. This solution and 130 parts of terephthalic acid of high purity were charged into an autoclave and heated to 100° C under an atmospheric pressure after air was purged with nitrogen. Then, propylene oxide was charged, while stirring, under a pressure of 4 Kg/cm$^2$ for 60 minutes. The pressure of the reactor was returned to atmospheric pressure and unreacted propylene oxide was recovered and further heating was continued to remove water. Then, the reaction mixture was added with 2,000 parts of xylene and heated to 130° C and then undissolved substances were filtered off. The filtrate was concentrated to recover xylene and 0.05 part of antimony acetate was added thereto, and then the resulting mixture was maintained at 280° C under a pressure of 0.5 mmHg for 4 hours to obtain a colorless and transparent polymer having a melting point of 106° C and an intrinsic viscosity of 0.26.

EXAMPLE 13

24 parts of sodium hydroxide was dissolved in 100 parts of water and the resulting solution together with 130 parts of isophthalic acid was charged into an autoclave and heated to 100° C under atmospheric pressure after air was purged with nitrogen. Then, ethylene oxide was charged, while stirring, under a pressure of 4 Kg/cm$^2$ for 35 minutes. The pressure of the reactor was returned to atmospheric pressure and unreacted ethylene oxide was recovered and further heating was continued to remove water. Thereafter, the reaction mixture was added with 500 parts of dichloroethane and heated to 80° C, and then undissolved substances were filtered off. The filtrate was concentrated to recover dichloroethane and 0.015 part of antimony oxide was added, and then the resulting mixture was maintained at 280° C under a pressure of 0.5 mmHg for 3 hours to obtain a colorless and transparent polyethylene isophthalate having a melting point of 150° C and an intrinsic viscosity of 0.57.

EXAMPLE 14

An aqueous solution of 12 parts of sodium hydroxide and 7.2 parts of lithium hydroxide dissolved in 100 parts of water was charged together with 130 parts of terephthalic acid of high purity into an autoclave and heated to 100° C under atmospheric pressure after air was purged with nitrogen. Then, ethylene oxide was charged, while stirring, under a pressure of 4 Kg/cm$^2$ for 30 minutes. The pressure of the reactor was returned to atmospheric pressure and unreacted ethylene oxide was recovered and further heating was continued to remove water. Then, the reaction mixture was added with 100 parts of n-butanol and 900 parts of xylene and heated to 110° C, and then undissolved substances were filtered off. The filtrate was concentrated to recover n-butanol and xylene and 0.04 part of antimony acetate was added, and then the resulting mixture was maintained at 280° C under a pressure of 0.5 mmHg for 3 hours to obtain a substantially colorless and transparent polyethylene terephthalate having a melting point of 266° C and an intrinsic viscosity of 0.68.

EXAMPLE 15

7.2 parts of lithium hydroxide was dissolved in 100 parts of water to prepare 3 mol/l of an aqueous solution, which was charged together with 150 parts of terephthalic acid of high purity in an autoclave equipped with a stirrer and heated to 90° C under atmospheric pressure after air was purged with nitrogen. Then, ethylene oxide was charged, while stirring, under a pressure of 3 Kg/cm$^2$ for 90 minutes. The pressure of the reactor was returned to atmospheric pressure and unreacted ethylene oxide was recovered and further heating was continued to remove water. The reaction mixture was added with 800 parts of n-butyl acetate and heated to 120° C, and then undissolved substances were filtered off. Thereafter, the filtrate was concentrated to recover n-butyl acetate and 50 parts of terephthalic acid of high purity and 0.06 part of antimony acetate were added thereto, and then the temperature was gradually raised. As the inner pressure increased during the temperature rising, water was removed while maintaining the pressure to 3 Kg/cm$^2$. After the temperature reached 280° C, the reaction mixture was polymerized under a pressure of 0.5 mmHg for 4 hours to obtain a colorless and transparent polyethylene terephthalate having an intrinsic viscosity of 0.66 and a melting point of 265° C.

EXAMPLE 16

To 90 parts of the undissolved substances separated in Example 1 were again added 100 parts of water and 100 parts of terephthalic acid of high purity and the resulting mixture was charged into an autoclave and heated to 100° C under atmospheric pressure after air was purged with nitrogen and then ethylene oxide was charged thereinto under a pressure of 4 Kg/cm$^2$ for 40 minutes. The pressure of the reactor was returned to atmospheric pressure and unreacted ethylene oxide was recovered and further heating was continued to remove water. Then, the reaction mixture was added with 500 parts of acetonitrile and undissolved substances were filtered off at 70° C. The filtrate was added with 0.05 part of antimony acetate and heated to recover acetonitrile and then maintained at 280° C under a pressure of 0.5 mmHg for 3.5 hours to obtain a substantially colorless and transparent (slightly light yellow) polyethylene terephthalate having an intrinsic viscosity of 0.68 and a melting point of 265° C.

What is claimed is:

1. A method for producing polyester which comprises:

reacting benzenedicarboxylic acid with alkylene oxide having from two to six carbon atoms, in water containing from 2.7 to 10 moles of alkali metal ion per one liter of water, the reaction being carried out at a temperature in the range of 60° to 140° C. and there being present in the reaction system undissolved alkali metal salt of said benzenedicarboxylic acid, to produce a reaction product containing diglycol ester;

contacting the reaction product with an organic solvent selected from the group consisting of esters, ethers, ketones, benzene and alkyl benzenes, halogenated hydrocarbons, nitriles, alcohols and mixtures thereof, to obtain an essentially water-free, organic solvent solution containing dissolved diglycol ester;

concentrating and/or crystallizing the solution to remove said solvent and then effecting a polycondensation reaction.

2. The method as claimed in claim 1, wherein said alkali metal ion is sodium or lithium.

3. The method as claimed in claim 1, wherein said alkali metal ion is lithium.

4. The method as claimed in claim 1, wherein the amount of said alkali metal ion in the reaction system is 3 to 8 moles per liter of water.

5. The method as claimed in claim 1, wherein said organic solvent is selected from the group consisting of chlorinated hydrocarbons, organic acid esters and ketones.

6. The method as claimed in claim 1, wherein said benzenedicarboxylic acid is selected from the group consisting of terephthalic acid, isophthalic acid and mixtures thereof.

7. The method as claimed in claim 1, wherein the amount of said benzenedicarboxylic acid in the reaction system is more than equivalent of the alkali metal ion in the reaction system.

8. The method as claimed in claim 1, wherein said alkylene oxide is selected from the group consisting of ethylene oxide, propylene oxide, butylene oxide, amylene oxide and hexene oxide.

9. The method as claimed in claim 1, wherein said organic solvent is used in an amount of 1 to 50 times the weight of the reaction mixture.

* * * * *